(12) United States Patent
Mansour et al.

(10) Patent No.: US 12,028,267 B1
(45) Date of Patent: Jul. 2, 2024

(54) DYNAMIC CHANNEL ALLOCATION OF NARROWBAND INTERNET OF THINGS AND LONG-TERM EVOLUTION MACHINE COMMUNICATIONS

(71) Applicant: T-MOBILE INNOVATIONS LLC, Overland Park, KS (US)

(72) Inventors: Nagi A. Mansour, Arlington, VA (US); Akin Ozozlu, McLean, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 18/080,217

(22) Filed: Dec. 13, 2022

(51) Int. Cl.
  *H04L 67/12* (2022.01)
  *G16Y 10/75* (2020.01)
  *H04L 47/76* (2022.01)

(52) U.S. Cl.
  CPC .............. *H04L 47/76* (2013.01); *H04L 67/12* (2013.01); *G16Y 10/75* (2020.01)

(58) Field of Classification Search
  CPC ...... H04W 16/14; H04W 28/26; G16Y 10/75; H04L 12/67; H04L 41/0896; H04L 41/5019; H04L 45/302; H04L 47/20; H04L 65/80
  See application file for complete search history.

(56) References Cited

U.S. PATENT DOCUMENTS

| | | | | |
|---|---|---|---|---|
| 8,982,826 B1 * | 3/2015 | Lambert | ............... | H04W 72/20 455/450 |
| 10,681,621 B2 * | 6/2020 | Ahmet | ............... | H04W 72/0446 |
| 2008/0294789 A1 * | 11/2008 | Nassor | ............. | H04N 21/64322 375/E7.014 |
| 2013/0051278 A1 * | 2/2013 | Watkins | ............ | H04W 28/0247 370/254 |
| 2014/0171018 A1 * | 6/2014 | Elrefaey | ............... | H04W 16/04 455/406 |
| 2018/0270820 A1 * | 9/2018 | Gupta | .................. | H04W 28/082 |
| 2018/0275923 A1 * | 9/2018 | Earhart | .................. | G06F 3/0604 |
| 2018/0376284 A1 * | 12/2018 | Soro | ....................... | H04L 67/12 |
| 2020/0100114 A1 * | 3/2020 | Ben Henda | ........... | H04W 12/02 |
| 2020/0267670 A1 * | 8/2020 | Åström | ................. | H04W 48/10 |
| 2021/0251004 A1 * | 8/2021 | Chendamarai Kannan | .................. | H04W 16/28 |
| 2021/0360608 A1 * | 11/2021 | Chakraborty | ......... | H04W 72/51 |

(Continued)

FOREIGN PATENT DOCUMENTS

WO  WO-2005081444 A1 *  9/2005  ........... H04B 7/0417

OTHER PUBLICATIONS

Sami Tabbane, IoT Standards; Sep. 2018; pp. 1-130 (Year: 2018).*

*Primary Examiner* — Schquita D Goodwin
*Assistant Examiner* — Linh T. Nguyen
(74) *Attorney, Agent, or Firm* — Shook, Hardy & Bacon L.L.P.

(57) ABSTRACT

Aspects provided herein provide methods, systems, and a non-transitory computer storage media storing computer-useable instructions for dynamic allocation of internet of things (IoT) device communications. The method begins with determining an amount of unallocated spectrum in a communications channel used by one or more devices attached to a node. Next, it is determined that the IoT device has requested an amount of spectrum from the node that is less than the amount of unallocated spectrum. At least a portion of the amount of unallocated spectrum is dynamically allocated to the IoT device.

20 Claims, 6 Drawing Sheets

(56) References Cited

U.S. PATENT DOCUMENTS

| | | | |
|---|---|---|---|
| 2023/0008259 A1* | 1/2023 | Xue | H04W 74/0816 |
| 2023/0129493 A1* | 4/2023 | Kiilerich Pratas | H04L 5/0057 |
| | | | 370/235 |
| 2023/0325226 A1* | 10/2023 | Malik | G06F 9/45558 |
| | | | 718/1 |

* cited by examiner

DYNAMIC CHANNEL ALLOCATION OF NARROWBAND INTERNET OF THINGS AND LONG-TERM EVOLUTION MACHINE COMMUNICATIONS

BACKGROUND

"Smart" devices are becoming increasingly a part of day-to-day life with many devices communicating information, health, and status information over the internet. Internet of things (IoT) devices communicate small amounts of data periodically to a gateway, router, or network. In many cases these devices report data on a periodic basis. A common application is a utility power meter that reports usage data to the company at regular intervals. This information is sent of bands allocated to this type of service and these bands can carry other traffic, such as voice. It may not be desirable for such IoT device traffic to be sent when the network is in high demand, such as morning or evening rush hour. In addition, network operators want to enhance spectral efficiency.

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

According to aspects herein, methods and systems for dynamic channel allocation for an internet of things (IoT) device are provided. The method begins with determining an amount of unallocated spectrum in a communications channel used by one or more devices attached to a node. The method then continues with determining that the IoT device has requested an amount of spectrum from the node that is less than the amount of unallocated spectrum. At least a portion of the unallocated spectrum is then dynamically allocated to the IoT device.

In a further embodiment, a method for dynamic channel allocation for an internet of things (IoT) device. The method begins with determining an amount of unallocated spectrum in a communication used by one or more devices attached to a node. The size of the at least one data stream from the IoT device is compared with the amount of unallocated spectrum. Based on the comparison, at least one data stream from the IoT device is dynamically allocated if the size of the data stream is equal to or less than the amount of unallocated spectrum.

An additional embodiment provides a non-transitory computer storage media storing computer-useable instructions that, when executed by one or more processors cause the processors to determine an amount of unallocated spectrum in a communications channel used by one or more devices attached to a node. After the determination of unallocated spectrum is made, the processors allocate dynamically to an internet of things (IoT) device at least a portion of the amount of unallocated spectrum.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
6G Sixth-Generation Cellular Communication System
AI Artificial Intelligence
CD-ROM Compact Disk Read Only Memory
CDMA Code Division Multiple Access
eNodeB Evolved Node B
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MIMO Multiple Input Multiple Output MD Mobile Device
ML Machine Learning
PC Personal Computer
PCS Personal Communications Service
PDA Personal Digital Assistant
PDSCH Physical Downlink Shared Channel
PHICH Physical Hybrid ARQ Indicator Channel
PUCCH Physical Uplink Control Channel
PUSCH Physical Uplink Shared Channel
RAM Random Access Memory
RET Remote Electrical Tilt
RF Radio-Frequency
RFI Radio-Frequency Interference
R/N Relay Node
RNR Reverse Noise Rise
ROM Read Only Memory
RSRP Reference Transmission Receive Power
RSRQ Reference Transmission Receive Quality
RS SI Received Transmission Strength Indicator
SINR Transmission-to-Interference-Plus-Noise Ratio
SNR Transmission-to-noise ratio
SON Self-Organizing Networks
TDMA Time Division Multiple Access
TXRU Transceiver (or Transceiver Unit)
UE User Equipment
UMTS Universal Mobile Telecommunications Systems
WCD Wireless Communication Device (interchangeable with UE)

Further, various technical terms are used throughout this description. An illustrative resource that fleshes out various aspects of these terms can be found in Newton's Telecom Dictionary, 25th Edition (2009).

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, a traditional telecommunications network employs a plurality of base stations (i.e., nodes, cell sites, cell towers) to provide network coverage. The base stations are employed to broadcast and transmit transmissions to user devices of the telecommunications network. An base station may be considered to be a portion of a base station that may comprise an antenna, a radio, and/or a controller. In aspects, a base station is defined by its ability to communicate with a user equipment (UE), such as a wireless communication device (WCD), according to a single protocol (e.g., 3G, 4G, LTE, 5G, or 6G, and the like); however, in other aspects, a single base station may communicate with a UE according to multiple protocols. As used herein, a base station may comprise one base station or more than one base station. Factors that can affect the telecommunications transmission include, e.g., location and size of the base stations, and frequency of the transmission, among other factors. The base stations are employed to broadcast and transmit transmissions to user devices of the telecommunications network. Traditionally, the base station establishes uplink (or downlink) transmission with a mobile handset over a single frequency that is exclusive to that particular uplink connection (e.g., an LTE connection with an EnodeB). In this regard, typically only one active uplink connection can occur per frequency. The base station may include one or more sectors served by individual transmitting/receiving components associated with the base station (e.g., antenna arrays controlled by an EnodeB). These transmitting/receiving components together form a multi-sector broadcast arc for communication with mobile handsets linked to the base station.

As used herein, "base station" is one or more transmitters or receivers or a combination of transmitters and receivers, including the accessory equipment, necessary at one location for providing a service involving the transmission, emission, and/or reception of radio waves for one or more specific telecommunication purposes to a mobile station (e.g., a UE), wherein the base station is not intended to be used while in motion in the provision of the service. The term/abbreviation UE (also referenced herein as a user device or wireless communications device (WCD)) can include any device employed by an end-user to communicate with a telecommunications network, such as a wireless telecommunications network. A UE can include a mobile device, a mobile broadband adapter, or any other communications device employed to communicate with the wireless telecommunications network. A UE, as one of ordinary skill in the art may appreciate, generally includes one or more antennas coupled to a radio for exchanging (e.g., transmitting and receiving) transmissions with a nearby base station. A UE may be, in an embodiment, similar to device 600 described herein with respect to FIG. 6.

As used herein, UE (also referenced herein as a user device or a wireless communication device) can include any device employed by an end-user to communicate with a wireless telecommunications network. A UE can include a mobile device, a mobile broadband adapter, a fixed location or temporarily fixed location device, or any other communications device employed to communicate with the wireless telecommunications network. For an illustrative example, a UE can include cell phones, smartphones, tablets, laptops, small cell network devices (such as micro cell, pico cell, femto cell, or similar devices), and so forth. Further, a UE can include a sensor or set of sensors coupled with any other communications device employed to communicate with the wireless telecommunications network; such as, but not limited to, a camera, a weather sensor (such as a rain gage, pressure sensor, thermometer, hygrometer, and so on), a motion detector, or any other sensor or combination of sensors. A UE, as one of ordinary skill in the art may appreciate, generally includes one or more antennas coupled to a radio for exchanging (e.g., transmitting and receiving) transmissions with a nearby base station.

In aspects, a UE provides UE data including location and channel quality information to the wireless communication network via the base station. Location information may be based on a current or last known position utilizing GPS or other satellite location services, terrestrial triangulation, an base station's physical location, or any other means of obtaining coarse or fine location information. Channel quality information may indicate a realized uplink and/or downlink transmission data rate, observed signal-to-interference-plus-noise ratio (SINR) and/or signal strength at the user device, or throughput of the connection. Channel quality information may be provided via, for example, an uplink pilot time slot, downlink pilot time slot, sounding reference signal, channel quality indicator (CQI), rank indicator, precoding matrix indicator, or some combination thereof. Channel quality information may be determined to be satisfactory or unsatisfactory, for example, based on exceeding or being less than a threshold. Location and channel quality information may take into account the user device capability, such as the number of antennas and the type of receiver used for detection. Processing of location and channel quality information may be done locally, at the base station or at the individual antenna array of the base station. In other aspects, the processing of said information may be done remotely.

A service state of the UEs may include, for example, an in-service state when a UE is in-network (i.e., using services of a primary provider to which the UE is subscribed to, otherwise referred to as a home network carrier), or when the UE is roaming (i.e., using services of a secondary provider providing coverage to the particular geographic location of the UE that has agreements in place with the primary provider of the UE). The service state of the UE may also include, for example, an emergency only state when the UE is out-of-network and there are no agreements in place between the primary provider of the UE and the secondary provider providing coverage to the current geographic location of the UE. Finally, the service state of the UE may also include, for example, an out of service state when there are no service providers at the particular geographic location of the UE.

The UE data may be collected at predetermined time intervals measured in milliseconds, seconds, minutes, hours, or days. Alternatively, the UE data may be collected continuously. The UE data may be stored at a storage device of the UE, and may be retrievable by the UE's primary provider as needed and/or the UE data may be stored in a cloud based storage database and may be retrievable by the UE's primary provider as needed. When the UE data is stored in the cloud based storage database, the data may be stored in association with a data identifier mapping the UE data back to the UE, or alternatively, the UE data may be collected without an identifier for anonymity.

In accordance with a first aspect of the present disclosure a method for dynamic channel allocation of internet of things (IoT) device is provided. The method begins with determining an amount of unallocated spectrum in a communications channel used by one or more devices attached to a node. Next, it is determined that the IoT device has requested an amount of spectrum from the node that is less than the amount of unallocated spectrum. At least a portion of the amount of unallocated spectrum is then dynamically allocated to the IoT device.

A second aspect of the present disclosure provides a method for dynamic channel allocation for an internet of things (IoT) device. The method begins with determining an amount of unallocated spectrum in a communications channel used by one or more devices attached to a node. The size of the data stream from the IoT device is then compared to the amount of unallocated spectrum. Based on the comparison, at least one data stream from the IoT device is dynamically allocated if the size of the at least one data stream from the IoT device is less than the amount of unallocated spectrum.

Another aspect of the present disclosure is directed to a non-transitory computer storage media storing computer-useable instructions that, when used by one or more processors, cause the processors to determine an amount of unallocated spectrum in a communications channel used by one or more device attached to a node. At least a portion of the amount of unallocated spectrum is dynamically allocated to an internet of things (IoT) device.

Figure 1:
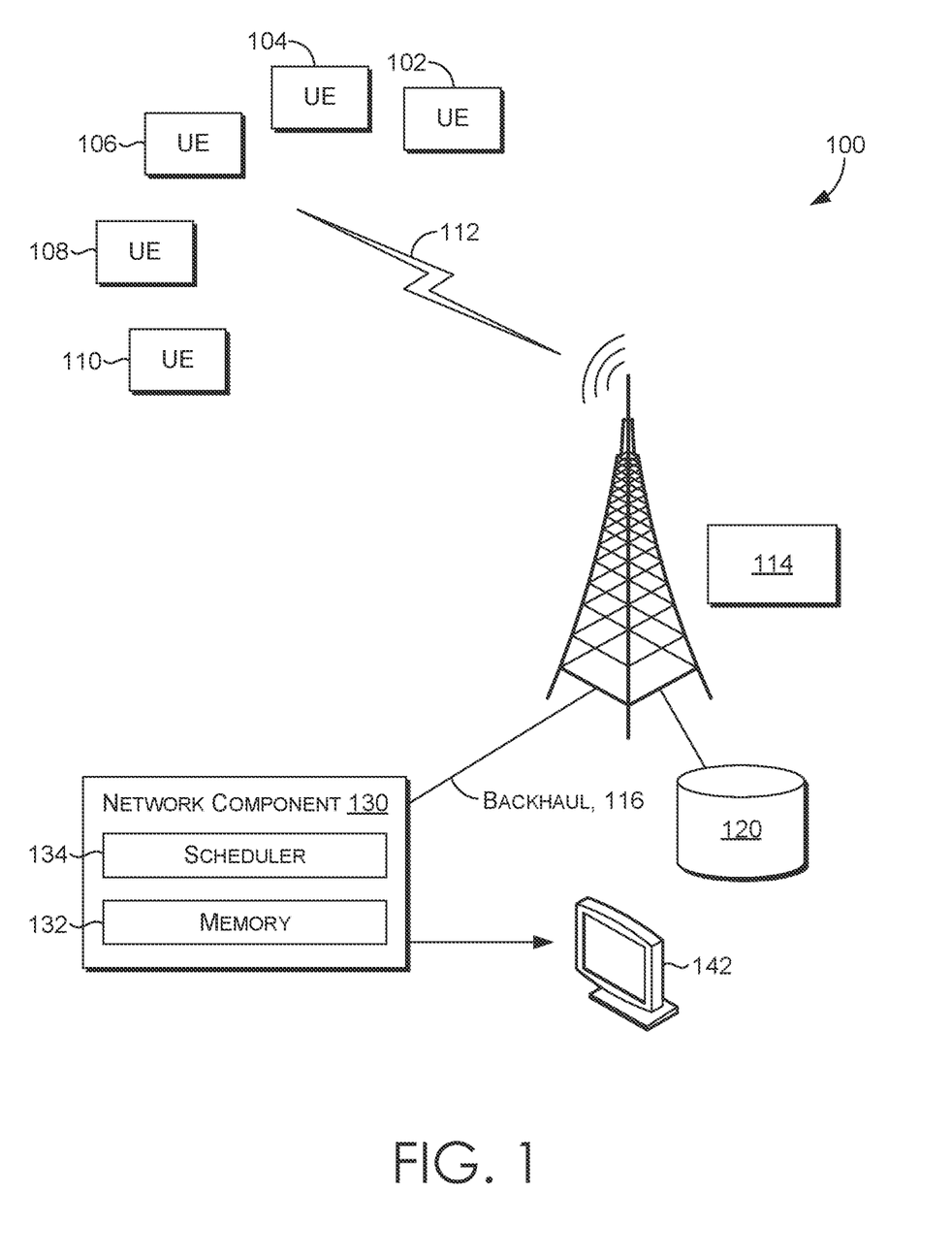
FIG. 1 depicts a diagram of an exemplary network environment in which implementations of the present disclosure may be employed, in accordance with aspects herein.

FIG. 1 illustrates an example of a network environment 100 suitable for use in implementing embodiments of the present disclosure. The network environment 100 is but one example of a suitable network environment and is not intended to suggest any limitation as to the scope of use or functionality of the disclosure. Neither should the network environment 100 be interpreted as having any dependency or requirement to any one or combination of components illustrated.

Network environment 100 includes user equipment (UE) devices 102, 104, 106, 108, and 110, base station 114 (which may be a cell site or the like), and one or more communication channels 112. An internet of things (IoT) device may also communicate through the network environment 100. The communication channels 112 can communicate over frequency bands assigned to the carrier. In network environment 100, UE devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device (600) that communicates via wireless communications with the base station 114 in order to interact with a public or private network.

Figure 6:
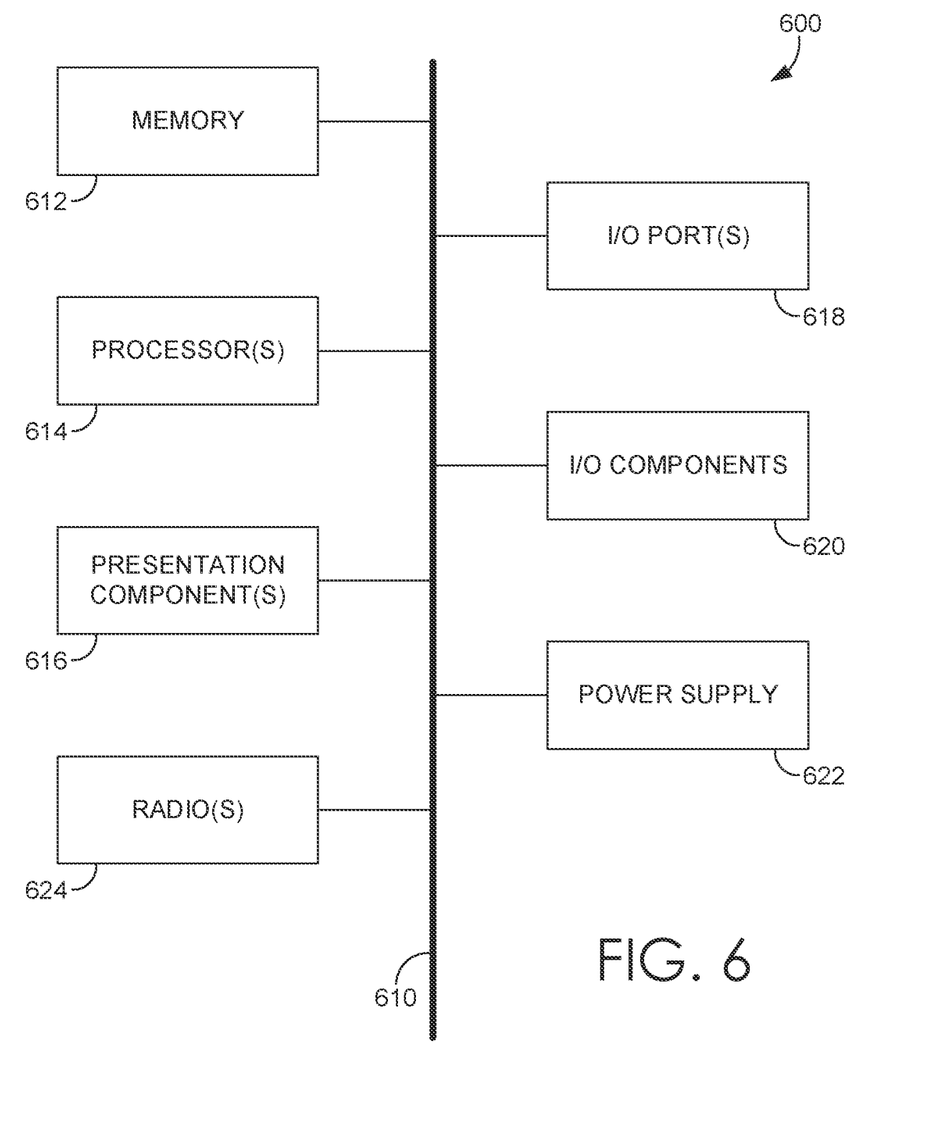
FIG. 6 depicts an exemplary computing device suitable for use in implementations of the present disclosure, in accordance with aspects herein.

In some aspects, each of the UEs 102, 104, 106, 108, and 110 may correspond to computing device 600 in FIG. 6. Thus, a UE can include, for example, a display(s), a power source(s) (e.g., a battery), a data store(s), a speaker(s), memory, a buffer(s), a radio(s) and the like. In some implementations, for example, devices such the UEs 102, 104, 106, 108, and 110 comprise a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some cases, UEs 102, 104, 106, 108, and 110 in network environment 100 can optionally utilize one or more communication channels 112 to communicate with other computing devices (e.g., a mobile device(s), a server(s), a personal computer(s), etc.) through base station 114. Base station 114 may be a gNodeB in a 5G or 6G network.

The network environment 100 may be comprised of a telecommunications network(s), or a portion thereof. A telecommunications network might include an array of devices or components (e.g., one or more base stations), some of which are not shown. Those devices or components may form network environments similar to what is shown in FIG. 1, and may also perform methods in accordance with the present disclosure. Components such as terminals, links, and nodes (as well as other components) can provide connectivity in various implementations. Network environment 100 can include multiple networks, as well as being a network of networks, but is shown in more simple form so as to not obscure other aspects of the present disclosure.

The one or more communication channels 112 can be part of a telecommunication network that connects sub scribers to their immediate telecommunications service provider (i.e., home network carrier). In some instances, the one or more communication channels 112 can be associated with a telecommunications provider that provides services (e.g., 3G network, 4G network, LTE network, 5G network, and the like) to user devices, such as UEs 102, 104, 106, 108, and 110. For example, the one or more communication channels may provide voice, SMS, and/or data services to UEs 102. 104, 106, 108, and 110, or corresponding users that are registered or subscribed to utilize the services provided by the telecommunications service provider. The one or more communication channels 112 can comprise, for example, a 1× circuit voice, a 3G network (e.g., CDMA, CDMA2000, WCDMA, GSM, UMTS), a 4G network (WiMAX, LTE, HSDPA), or a 5G network or a 6G network.

In some implementations, base station 114 is configured to communicate with a UE, such as UEs 102, 104, 106, 108, and 110, that are located within the geographic area, or cell, covered by radio antennas of base station 114. Base station 114 may include one or more base stations, base transmitter stations, radios, antennas, antenna arrays, power amplifiers, transmitters/receivers, digital signal processors, control electronics, GPS equipment, and the like. In particular, base station 114 may selectively communicate with the user devices using dynamic beamforming.

As shown, base station 114 is in communication with a network component 130 and at least a network database 120 via a backhaul channel 116. As the UEs 102, 104, 106, 108, and 110 collect individual status data, the status data can be automatically communicated by each of the UEs 102, 104, 106, 108, and 110 to the base station 114. Base station 114 may store the data communicated by the UEs 102, 104, 106, 108, and 110 at a network database 120. Alternatively, the base station 114 may automatically retrieve the status data from the UEs 102, 104, 106, 108, and 110, and similarly store the data in the network database 120. The data may be communicated or retrieved and stored periodically within a predetermined time interval which may be in seconds, minutes, hours, days, months, years, and the like. With the incoming of new data, the network database 120 may be refreshed with the new data every time, or within a predetermined time threshold so as to keep the status data stored in the network database 120 current. For example, the data may be received at or retrieved by the base station 114 every 10 minutes and the data stored at the network database 120 may be kept current for 30 days, which means that status data that is older than 30 days would be replaced by newer status data at 10 minute intervals. As described above, the status data collected by the UEs 102, 104, 106, 108, and 110 can include, for example, service state status, the respective UE's current geographic location, a current time, a strength of the wireless signal, available networks, and the like.

The network component 130 comprises a memory 132 and a scheduler 134. All determinations, calculations, and data further generated by the scheduler 134 may be stored at the memory 132 and also at the data store 140. Although the network component 130 is shown as a single component comprising the memory 132 and the scheduler 134, it is also contemplated that each of the memory 132 and scheduler may reside at different locations, be its own separate entity, and the like, within the home network carrier system.

The network component 130 is configured to retrieve signal information, UE device information, latency information, including quality of service (QoS) information, and metrics from the base station 114 or one of the UE devices 102, 104, 106, 108, and 110. UE device information can include a device identifier and data usage information. The scheduler 134 can monitor the activity of the UE devices 102, 104, 106, 108, and 110 as well as any NB-IoT and LTE-M devices in the network. The scheduler then determines when a channel has unallocated capacity that could be used to transmit the data collected by the NB-IoT and LTE-M devices. Based on the determination by the scheduler, the NB-IoT and LTE-M devices transmit their data when directed. A NB-IoT device transmission occupies one physical resource block (PRB) of 180 kHz in a 20 MHz channel. A LTE-M device transmission occupies 6 PRBs. The UEs 102, 104, 106, 108, and 110 occupy 18 MHz of the available 20 MHz channel, leaving 2 MHz for potential use by the NB-IoT and LTE-M devices. Assigning the unallocated channel capacity to the NB-IoT and LTE-M devices improves spectral efficiency.

Figure 2:
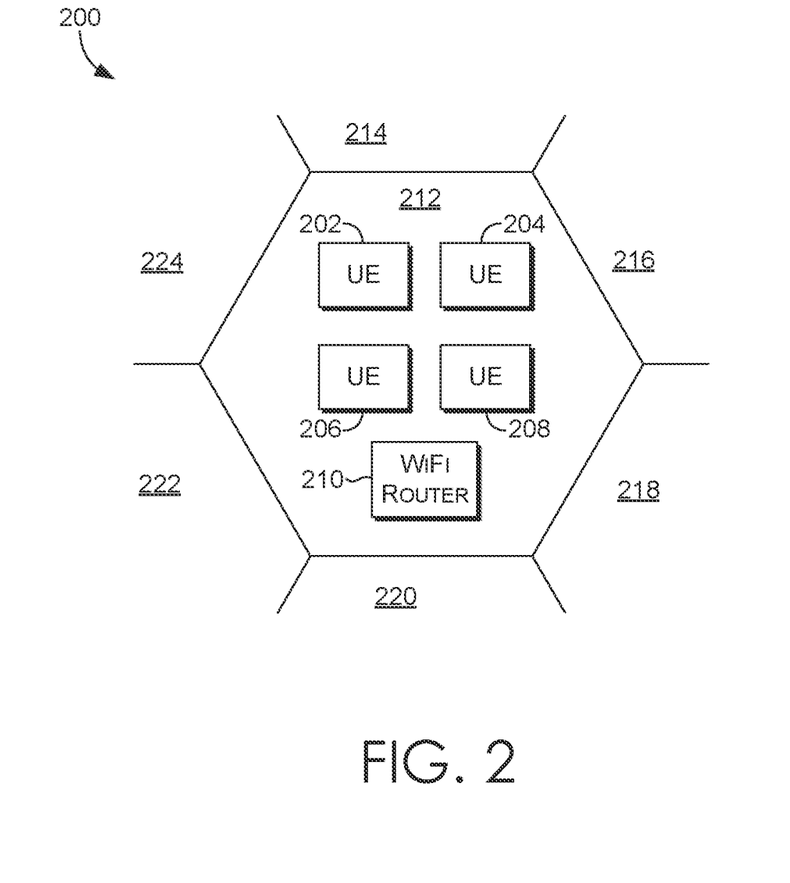
FIG. 2 depicts a cellular network suitable for use in implementations of the present disclosure, in accordance with aspects herein.

FIG. 2 depicts a cellular network suitable for use in implementations of the present disclosure, in accordance with aspects herein. For example, as shown in FIG. 2, each geographic area in the plurality of geographic areas may have a hexagonal shape such as hexagon representing a geographic area 200 having cells 212, 214, 216, 218, 220, 222, 224, each including base station or base station 114, backhaul channel 116, antenna for sending and receiving signals over communication channels 112, network database 120 and network component 130. The size of the geographic area 200 may be predetermined based on a level of granularity, detail, and/or accuracy desired for the determinations/calculations done by the systems, computerized methods, and computer-storage media. A plurality of UEs may be located within each geographic area collecting UE data within the geographic area at a given time. For example, as shown in FIG. 2, UEs 202, 204, 206, 208, and WiFi router 210, may be located within geographic area 200 collecting UE data that is useable by network component 130, in accordance with aspects herein. UEs 202, 204, 206, and 208 can move within the cell currently occupying, such as cell 212 and can move to other cells such as adjoining cells 214, 216, 218, 220, 222 and 224.

Figure 3:
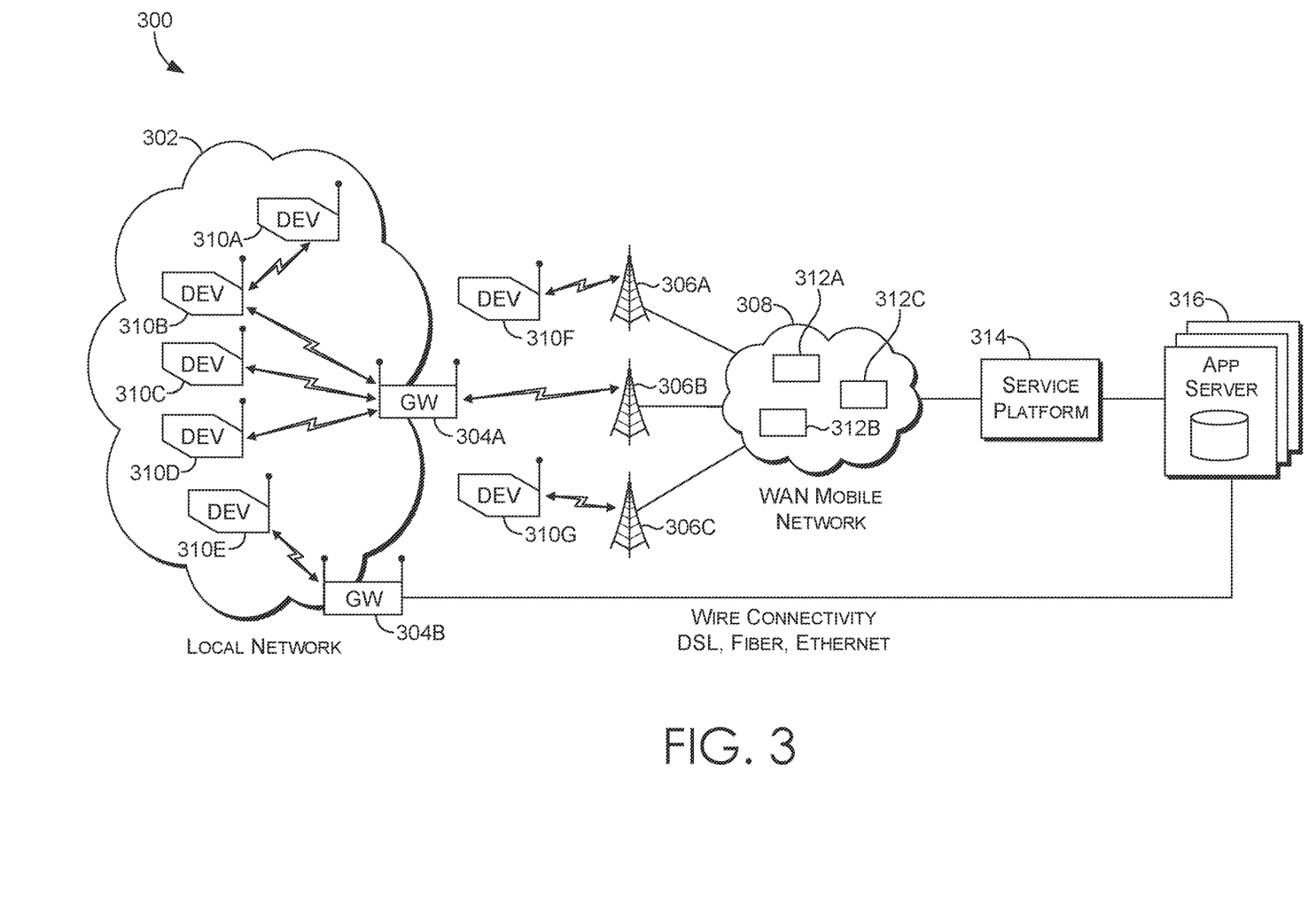
FIG. 3 depicts a diagram of an exemplary network environment incorporating internet of things (IoT) devices, in which implementations of the present disclosure may be employed, in accordance with aspects herein.

FIG. 3 depicts a diagram of an exemplary network environment incorporating internet of things (IoT) devices, in which implementations of the present disclosure may be employed, in accordance with aspects herein. The network 300 illustrates how NB-IoT and LTE-M devices such as devices 310 A, 310 B, 310 C, 310 D, 310 E, 310 F, and 310 G may interface with the network 300. The IoT devices 310 A-310 G may be devices such as meters, sensors, and similar devices that incorporate a simple radio for communicating with a local network, such as a local area network (LAN). The IoT devices may be indoors or may be remote. Such devices may send a small amount of data to the network on a periodic basis and the data transfer schedule may be scheduled or on an as-needed basis. Scheduling may be used where a large number of devices may be sending data and congestion may occur. In addition, scheduling may be preferred as a power saving strategy as IoT devices are low power devices with limited power capability. Network congestion can result because of the large number of connection contexts stored data in network nodes. Local network 302 may be in communication with devices 310 A, 310 B, 310 C, 310 D, and 310 E through gateways 304 A and 304 B. Devices 310 A, 310 B, 310 C, and 310 D may communicate with gateway 304 A, while IoT device 310 D may communicate with gateway 304 B. The gateways 304 A and 304 B may also be routers.

The gateways 304 A and 304 B can relay information from the IoT devices 310 A-310 E to the network. Gateway 304 A relays data from IoT devices 310 A-310 E to a cell tower 306 B. In contrast, gateway 304 B has a wired connectivity to the service platform 314. The wired connectivity may be digital subscriber line (DSL), optical fiber, or Ethernet. Some IoT devices, such as IoT devices 310 F and 310 G may connect directly to the network. For example, IoT device 310 F is in communication with cell tower 306A and IoT device 310 G may be in communication with cell tower 306 C. The cell towers 306 A-306 C may be in communication with a wide area network (WAN) 308. The WAN mobile network may comprise devices 312 A, 312 B, and 312 C. Devices 312 A-C may be any device type as discussed herein, including routers or gateways. The wireless WAN 308 may be used for long-range communication on licensed or unlicensed spectrum and the devices using the WAN 308 may use NB-IoT or LTE-Cat M1.

The WAN mobile network 308 is in communication with service platform 314. The service platform 314 serves as a service clearinghouse for the IoT devices and as a means of accessing the application server 316. Application server 316 hosts a variety of applications that are used by the IoT devices 310 A-G to perform their functions. Applications on the application server 316 can include billing data collection for utilities, health monitoring of patient monitoring equipment. The application server 316 may also transmit data and commands to the IoT devices through the service platform 314.

Figure 4:
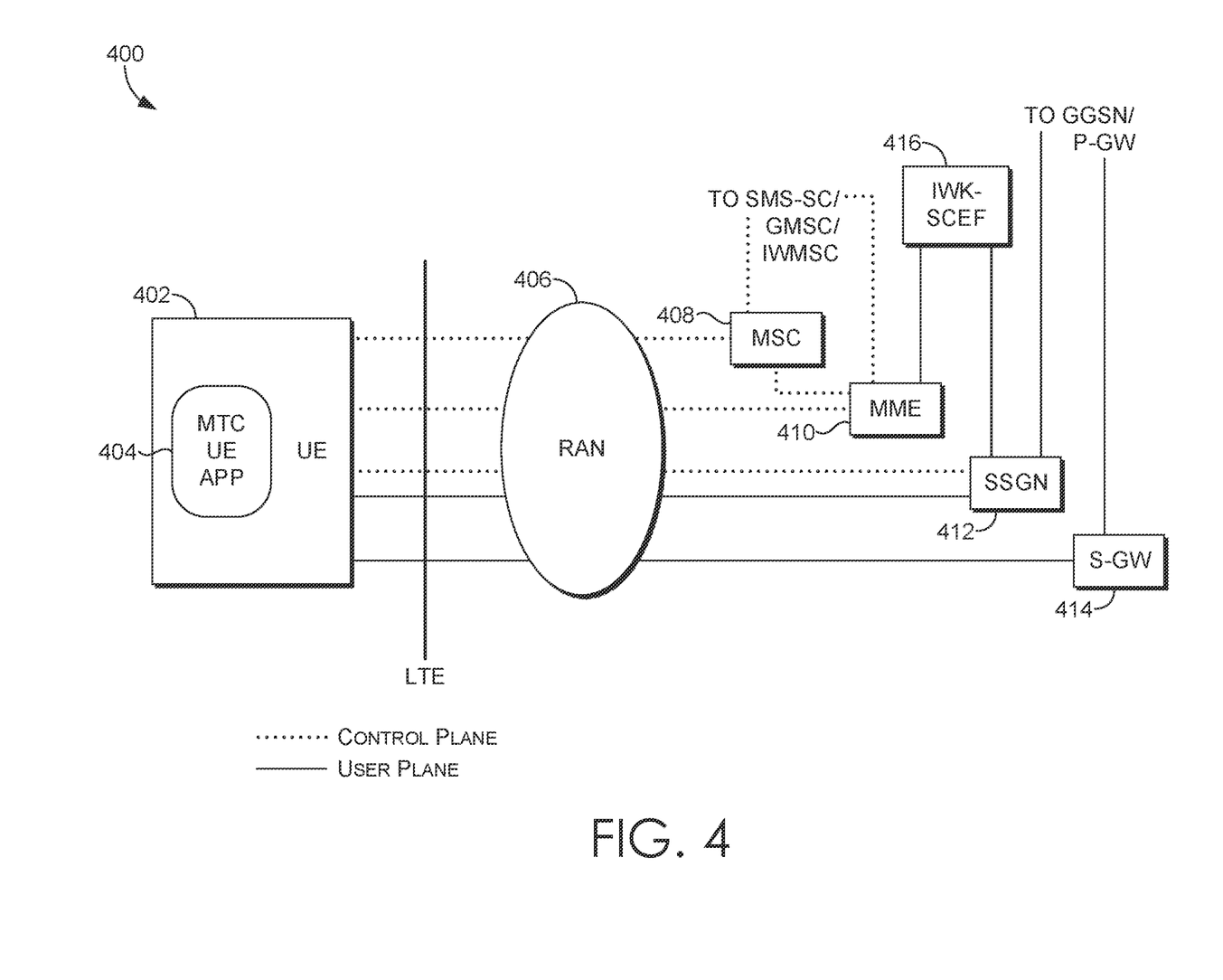
FIG. 4 is a diagram of an internet of things (IoT) device interfacing with a radio access network in which implementations of the present disclosure may be employed, in accordance with aspects herein.

FIG. 4 is a diagram of an internet of things (IoT) device interfacing with a radio access network in which implementations of the present disclosure may be employed, in accordance with aspects here. FIG. 4 provides information on how an IoT device can access a radio access network (RAN) and describes which network entities interact with the IoT device. The network 400 includes a UE 402 which may include a machine type communications (MTC) UE application 404. The network 400 may implement a long term evolution (LTE) Cat-M1, which is an IoT technology that allows IoT devices to connect directly to a 4G network.

The UE 402 with the MTC UE application 404 accesses the network 400. The UE 402 accesses the network 400 using both control plane connections and user plane connections. The UE 402 access the RAN 406 with one control plane connection from the RAN 406 to the mobile switching center (MSC) 408. From the MSC 408 the control plane signal is sent to the interworking mobile switching center, global system for mobile communications, or short message service (SMS) service center, depending on network deployment. A further control plane connection routes a signal from the RAN 406 to the mobility management entity (MME) 410. The MME 410 may also be in communication with the MSC 408. The RAN 406 may also be in communication with the serving general packet radio services (GPRS) support node (SGSN) 412. The MME 410 and the SSGN 412 may also be in communication over the user plane with an interworking service capabilities exposure function (IWK SCEF). The RAN 406 may also be in communication with a serving gateway (S-GW) 414 which may be in communication with a gateway GPRS (GGSN) or packet gateway.

Figure 5:
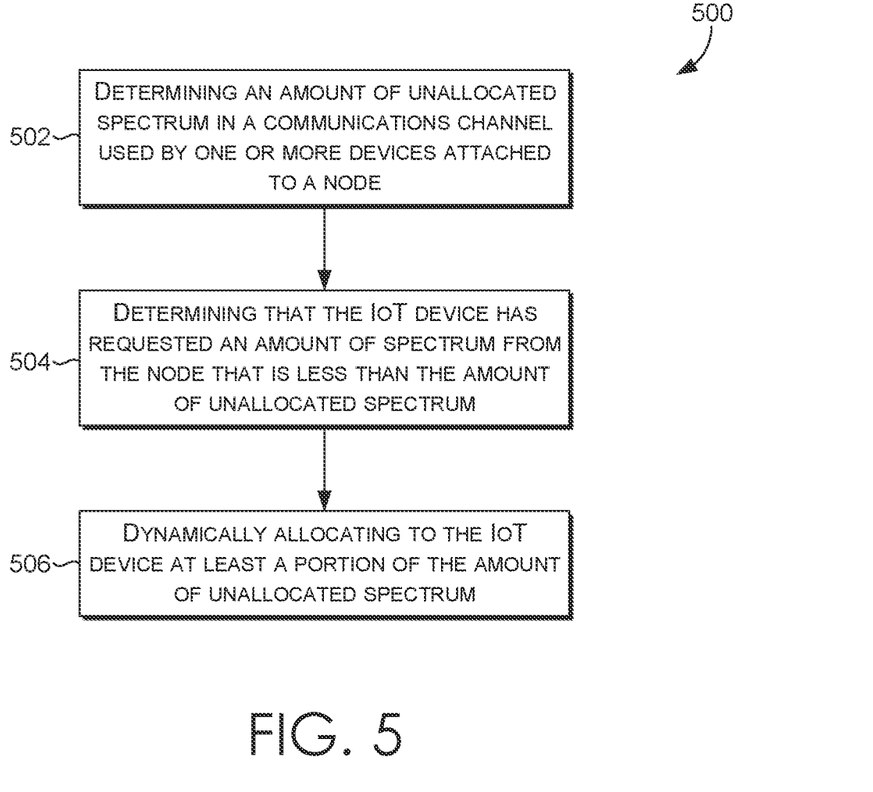
FIG. 5 is a flow diagram of an exemplary method for dynamic channel allocation of narrowband internet of things (NB-IoT) and long-term evolution machine communications (LTE-M), in which aspects of the present disclosure may be employed, in accordance with aspects herein.

FIG. 5 is a flow diagram of an exemplary method of dynamic channel allocation for a narrowband internet of things (NB-IoT) device and long-term evolution machine communications (LTE-M) device, in which aspects of the present disclosure may be employed, in accordance with aspects herein. The method 500 begins with determining an amount of unallocated spectrum in a communications channel used by one or more devices attached to a node in step 502. The determining may occur when an IoT devices indicates it has a data stream to send, or a scheduler may hold multiple data streams from IoT devices as part of a scheduling plan for the IoT devices. Once the amount of unoccupied spectrum has been determined the method continues with determining that the IoT device has requested an amount of spectrum from the node that is less than the amount of unallocated spectrum in step 504. Depending on the amount of unoccupied spectrum in the communications channel multiple data streams from multiple IoT devices may be scheduled. The method concludes in step 506 with dynamically allocating to the IoT device at least a portion of the amount of unallocated spectrum. The dynamic allocation may provide for allocating a NB-IoT data stream on one resource block and filling the unoccupied spectrum with only NB-IoT data streams. The unoccupied spectrum may be used for six physical resource blocks for a LTE-CAT M1 data stream and filling the unoccupied spectrum with only LTE-CAT M1 data streams. The unallocated spectrum may also be filled with a mixture of both NB-IoT and LTE CAT M1 data, depending on the amount of unallocated spectrum available.

FIG. 6 depicts an exemplary computing device suitable for use in implementations of the present disclosure, in accordance with aspects herein. With continued reference to FIG. 6, computing device 600 includes bus 602 that directly or indirectly couples the following devices: memory 604, one or more processors 606, one or more presentation components 608, input/output (I/O) ports 612, I/O components 610, radio 616, transmitter 618, and power supply 614. Bus 602 represents what may be one or more busses (such as an address bus, data bus, or combination thereof). Although the devices of FIG. 6 are shown with lines for the sake of clarity, in reality, delineating various components is not so clear, and metaphorically, the lines would more accurately be grey and fuzzy. For example, one may consider a presentation component such as a display device to be one of I/O components 610. Also, processors, such as one or more processors 606, have memory. The present disclosure hereof recognizes that such is the nature of the art, and reiterates that FIG. 6 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 6 and refer to "computer" or "computing device."

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 604 includes computer-storage media in the form of volatile and/or nonvolatile memory. Memory 604 may be removable, nonremovable, or a combination thereof. Exemplary memory includes solid-state memory, hard drives, optical-disc drives, etc. Computing device 600 includes one or more processors 506 that read data from various entities such as bus 602, memory 604 or I/O components 610. One or more presentation components 608 present data indications to a person or other device. Exemplary one or more presentation components 608 include a display device, speaker, printing component, vibrating component, etc. I/O ports 612 allow computing device 600 to be logically coupled to other devices including I/O components 610, some of which may be built into computing device 600. Illustrative I/O components 610 include a microphone, joystick, game pad, satellite dish, scanner, printer, wireless device, etc.

The radio 616 represents one or more radios that facilitate communication with a wireless telecommunications network. While a single radio 616 is shown in FIG. 6, it is contemplated that there may be more than one radio 616 coupled to the bus 602. In aspects, the radio 616 utilizes a transmitter 618 to communicate with the wireless telecommunications network. It is expressly conceived that a computing device with more than one radio 616 could facilitate communication with the wireless telecommunications network via both the first transmitter 618 and an additional transmitters (e.g. a second transmitter). Illustrative wireless telecommunications technologies include CDMA, GPRS, TDMA, GSM, and the like. The radio 616 may additionally or alternatively facilitate other types of wireless communications including Wi-Fi, WiMAX, LTE, 3G, 4G, LTE, 5G, NR, VoLTE, or other VoIP communications. As can be appreciated, in various embodiments, radio 616 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even base stations (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method of dynamic channel allocation for an internet of things (IoT) device, the method comprising:
   determining an amount of unallocated spectrum in a communications channel used by one or more devices attached to a node;
   comparing the size of at least one data stream from the IoT device to the amount of unallocated spectrum; and
   based on the comparison, dynamically allocating the at least one data stream from the IoT device if the size of the at least one data stream from the IoT device is equal to or less than the amount of unallocated spectrum, wherein the at least a portion of the unallocated spectrum comprises a data stream that is equal to or less than the amount of unallocated spectrum.

2. The method of claim 1, wherein dynamically allocating from the IoT device the at least a portion of the amount of unallocated spectrum allocates a narrowband internet of things (NB-IoT) data stream.

3. The method of claim 1, wherein dynamically allocating from the IoT device the at least a portion of the amount of unallocated spectrum allocates a long term evolution category machine one (LTE CAT M1) data stream.

4. The method of claim 2, wherein dynamically allocating from the IoT device the at least a portion of the amount of unallocated spectrum allocates the NB-IoT data stream and at least one resource block of data.

5. The method of claim 3, wherein dynamically allocating from the IoT device the at least a portion of the amount of unallocated spectrum allocates the LTE-CAT M1 data stream and at least six physical resource blocks.

6. The method of claim 4, wherein dynamically allocating from the IoT device the at least a portion of the unallocated spectrum allocates only NB-IoT communications.

7. The method of claim 5, wherein dynamically allocating from the IoT device the at least a portion of the unallocated spectrum allocates only LTE-CAT M1 communications.

8. The method of claim 1, wherein dynamically allocating from the IoT device the at least a portion of the unallocated spectrum allocates the NB-IoT and LTE-CAT M1 communications.

9. A method of dynamic channel allocation for an internet of things (IoT) device, the method comprising:
   determining an amount of unallocated spectrum in a communications channel used by one or more devices attached to a node;
   comparing a size of at least one data stream from the IoT device to the amount of unallocated spectrum; and
   based on the comparison, dynamically allocating the at least one data stream from the IoT device if the size of the at least one data stream from the IoT device is equal to or less than the amount of unallocated spectrum.

10. The method of claim 9, wherein dynamically allocating the at least one data stream from the IoT device allocates a long term evolution category machine one (LTE CAT M1) data stream.

11. The method of claim 9, wherein dynamically allocating the at least one data stream from the IoT device allocates a narrowband internet of things (NB-IoT) data stream.

12. The method of claim 11, wherein dynamically allocating the at least one data stream from the IoT device allocates the NB-IoT data stream and allocates at least one resource block of data.

13. The method of claim 10, wherein dynamically allocating the at least one data stream from the IoT device allocates the LTE CAT M1 data stream and schedules at least six physical resource blocks.

14. The method of claim 10, wherein dynamically allocating the at least one data stream from the IoT device allocates only LTE-CAT M1 communications.

15. The method of claim 11, wherein dynamically allocating the at least one data stream from the IoT device allocates only NB-IoT communications.

16. The method of claim 9, wherein dynamically allocating the at least one data stream from the IoT devices allocates NB-IoT and LTE-CAT M1 communications.

17. A non-transitory computer storage media storing computer-useable instructions that, when used by one or more processors, cause the processors to:
   determine an amount of unallocated spectrum in a communications channel used by one or more devices attached to a node;
   comparing the size of at least one data stream from an internet of things (IoT) device to the amount of unallocated spectrum; and
   based on the comparison, allocate dynamically from the IoT device at least a portion of the amount of unallocated spectrum, wherein the at least a portion of the unallocated spectrum comprises a data stream that is equal to or less than the amount of unallocated spectrum.

18. The non-transitory computer storage media of claim 17, wherein dynamically allocating the at least one data stream from to the IoT device allocates a narrowband internet of things (NB-IoT) data stream.

19. The non-transitory computer storage media of claim 17, wherein dynamically allocating the at least one data stream from to the IoT device allocates a long term evolution category machine one (LTE-CAT M1) data stream.

20. The non-transitory computer storage media of claim 17, wherein dynamically allocating the at least one data stream from to IoT device allocates NB-IoT and LTE-CAT M1 data streams.

\* \* \* \* \*